United States Patent [19]
Asano

[11] Patent Number: 5,872,955
[45] Date of Patent: Feb. 16, 1999

[54] METHOD AND APPARATUS FOR READING AND WRITING DATA IN A DISK DRIVE SYSTEM

[75] Inventor: Hideo Asano, Tokyo, Japan

[73] Assignee: International Business Machines Corporation, Armonk, N.Y.

[21] Appl. No.: 564,567

[22] Filed: Nov. 28, 1995

[30] Foreign Application Priority Data

Nov. 29, 1994 [JP] Japan .................................. 6-294139

[51] Int. Cl.$^6$ .............................. G06F 3/06; G06F 13/00
[52] U.S. Cl. ...................... 395/500; 395/824; 395/183.2; 369/44.33; 369/96; 711/202; 711/204; 371/10.2
[58] Field of Search .................................. 395/500, 612, 395/613, 412, 415, 419, 824, 183.2, 182.04; 369/47, 53, 96, 54, 48, 44.33; 360/48, 49, 53; 711/110, 1, 114, 200–209; 371/10.1, 10.2

[56] References Cited

U.S. PATENT DOCUMENTS

| | | | |
|---|---|---|---|
| 4,584,617 | 4/1986 | Libove et al. | 360/49 |
| 5,034,914 | 7/1991 | Osterlund | 364/900 |
| 5,042,023 | 8/1991 | Yokota | 369/47 |
| 5,113,512 | 5/1992 | Miki et al. | 395/425 |
| 5,233,591 | 8/1993 | Nishihara | 369/54 |
| 5,235,585 | 8/1993 | Bish et al. | 369/54 |
| 5,241,672 | 8/1993 | Slomcenski et al. | 395/600 |
| 5,313,626 | 5/1994 | Jones et al. | 395/575 |
| 5,325,525 | 6/1994 | Shan et al. | 395/650 |
| 5,357,381 | 10/1994 | Yasuda et al. | 360/53 |
| 5,386,524 | 1/1995 | Lary et al. | 395/400 |
| 5,408,644 | 4/1995 | Schneider et al. | 395/575 |
| 5,422,762 | 6/1995 | Jerbic | 360/48 |
| 5,454,103 | 9/1995 | Converston et al. | 395/600 |
| 5,559,765 | 9/1996 | Andou | 369/32 |
| 5,586,292 | 12/1996 | Yamuguchi | 395/441 |
| 5,588,129 | 12/1996 | Ballard | 395/440 |
| 5,608,891 | 3/1997 | Mizuno et al. | 395/441 |

FOREIGN PATENT DOCUMENTS

| | | | |
|---|---|---|---|
| 653698 | 5/1995 | European Pat. Off. | G06F 3/06 |
| 60-254463 | 12/1985 | Japan | G11B 20/18 |
| 4-5723 | 1/1992 | Japan | G06F 3/06 |
| 6-111482 | 4/1994 | Japan . | |

Primary Examiner—Kevin J. Teska
Assistant Examiner—Thai Phan
Attorney, Agent, or Firm—Paik Saber

[57] ABSTRACT

To reduce read and write times for data in a disk drive, the data of a file is rearranged into continuous recording areas on a disk. A file has a host-specified address and a physical address. The physical address corresponds to the recording area on a disk where the file is stored. The host-specified and physical addresses are stored in a conversion table. The controller receives the host-specified address and a command for reading the file. Based on the host-specified address, the controller determines the physical address from the conversion table. Based on the physical address, the controller reads the data from the disk and sends the data to the host. Thereafter, the controller examines the physical address in the conversion table to determine if the data is recorded on a physically continuous recording area on the disk. If not, the data is moved to a physically continuous recording area, and the physical address in the conversion table is updated.

14 Claims, 13 Drawing Sheets

FIG. 5

| FILE NAME | C | H | S |
|---|---|---|---|
| AAA | 11 | 5 | 5 |
|  | 11 | 5 | 6 |
|  | 11 | 5 | 7 |
|  | 11 | 5 | 14 |
|  | 11 | 5 | 15 |
|  | 11 | 5 | 16 |
| BBB | 11 | 5 | 8 |
|  | 11 | 5 | 9 |
|  | 11 | 5 | 10 |
|  |  |  |  |

FIG. 6

| ADDRESS THAT A HOST CONTROLS | | | ADDRESS ON DISK | | |
|---|---|---|---|---|---|
| C | H | S | C | H | S |
| 11 | 5 | 5 | 11 | 5 | 5 |
| 11 | 5 | 6 | 11 | 5 | 6 |
| 11 | 5 | 7 | 11 | 5 | 7 |
| 11 | 5 | 14 | 11 | 5 | 8 |
| 11 | 5 | 15 | 11 | 5 | 9 |
| 11 | 5 | 16 | 11 | 5 | 10 |
| 11 | 5 | 8 | 11 | 5 | 14 |
| 11 | 5 | 9 | 11 | 5 | 15 |
| 11 | 5 | 10 | 11 | 5 | 16 |
|  |  |  |  |  |  |

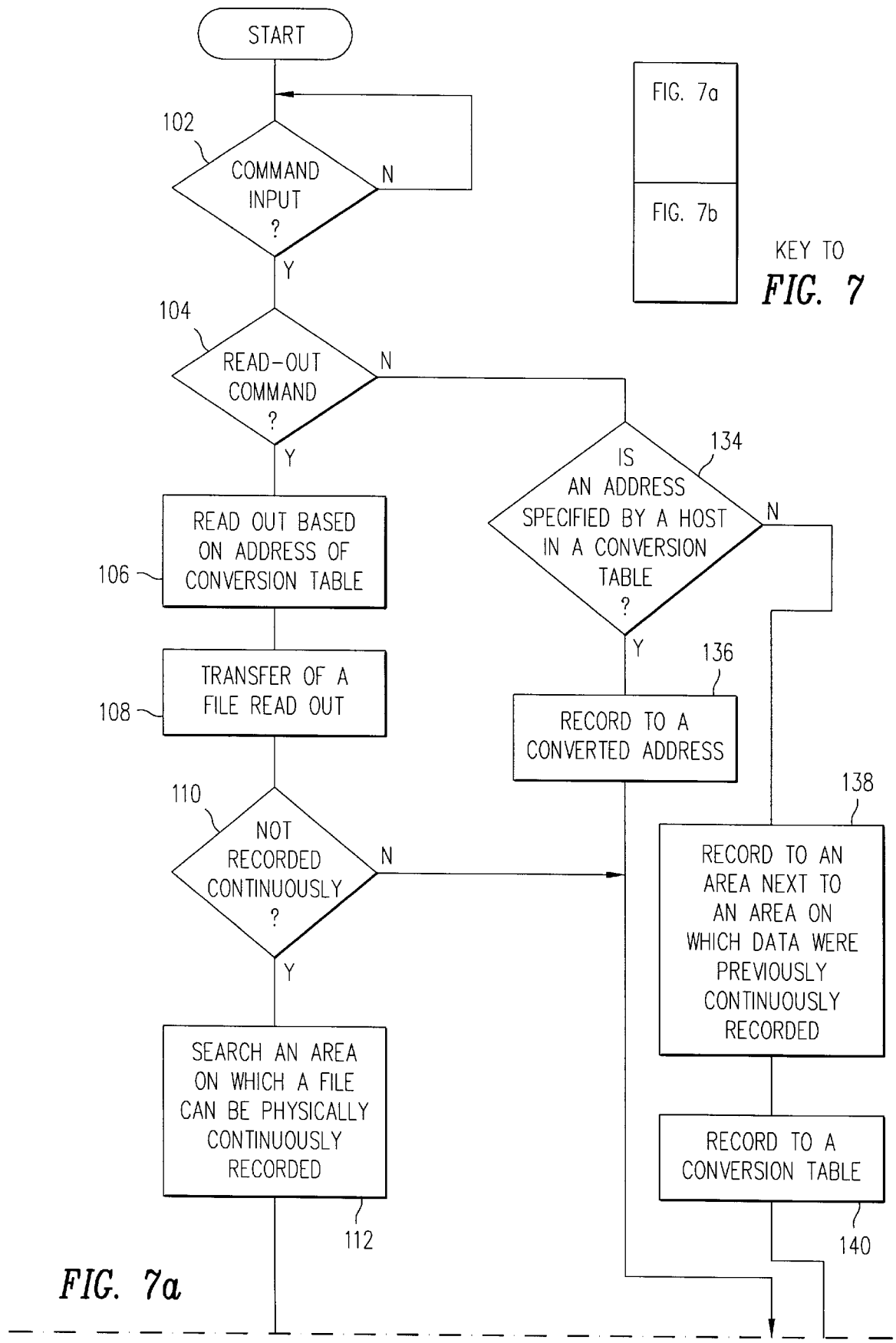

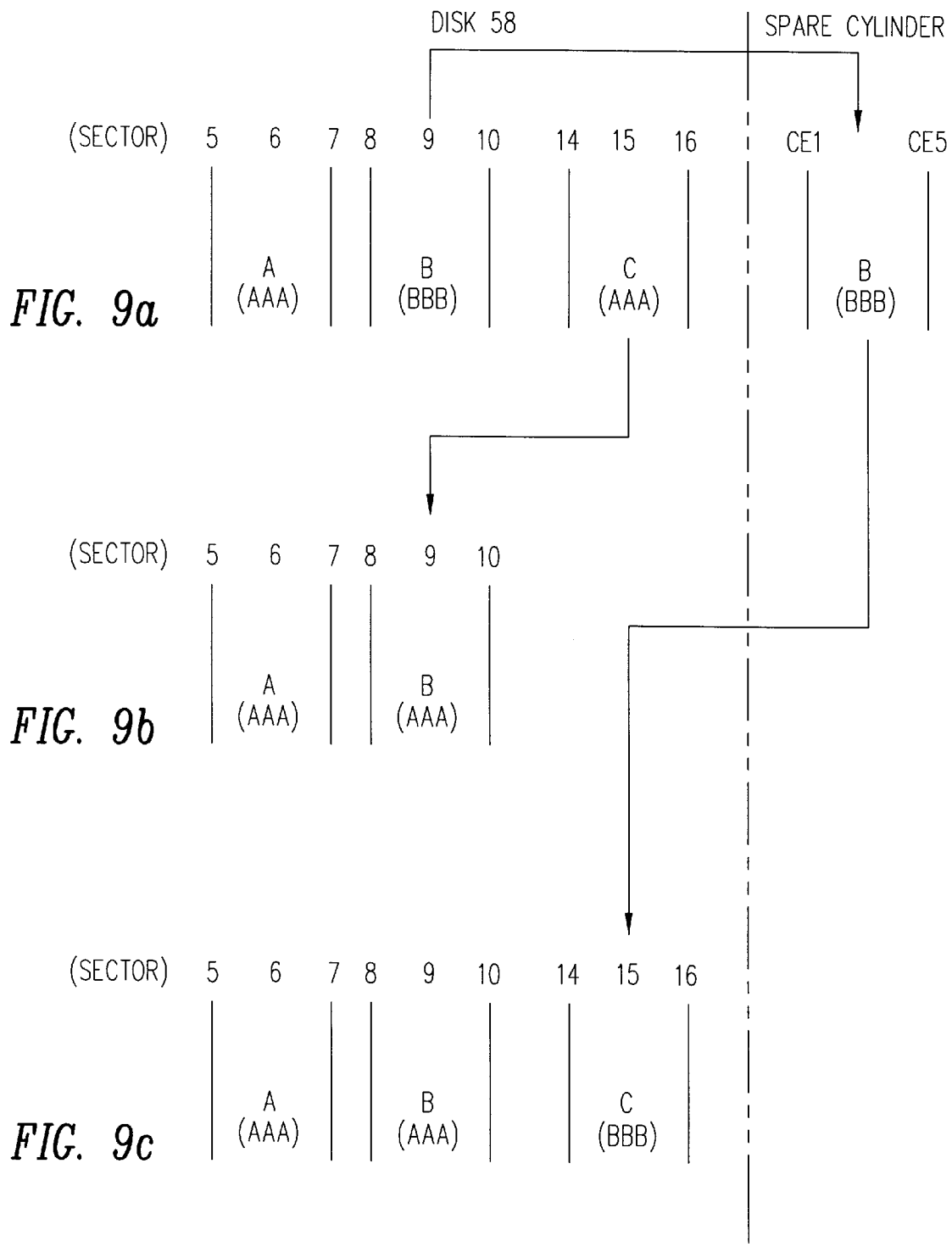

METHOD AND APPARATUS FOR READING AND WRITING DATA IN A DISK DRIVE SYSTEM

BACKGROUND OF THE INVENTION

1. Technical Field

The present invention relates to a method and apparatus for reading and writing data in a disk drive system, and in particular to a method and apparatus for rearranging the data stored on a disk into continuous locations after reading the data.

2. Description of the Background Art

Typically, the host computer, hereinafter referred to as host, controls the storage location of data on a disk drive, such as a hard disk drive. A file is comprised of data sets. In particular, the host specifies the cylinder, head, and sector addresses of each data constituting a file, hereinafter referred to as a data set, stored on the hard disk, then reads or writes the file. Under host control, the data sets are recorded on a predetermined area of the disk corresponding to the cylinder, head, and sector addresses.

Since the host controls the location of data recorded on the disk, the data sets are recorded physically discretely. Recording data physically discretely means that the data are not recorded on continuous sectors of the disk. Because the data sets are recorded physically discretely, a longer seek time is needed to read and write one file.

PUPA 4-5723 proposes a disk drive provided with a relatively large capacity buffer which uses a cache to store data previously read from the hard disk in the buffer.

If the above-described disk drive receives a read command from the host, it checks whether the data requested by the host is stored in the buffer. If the data is not stored in the buffer, the data is transferred from the hard disk to the host. Based on the transferred data, the disk drive predicts the data that the host will next request, and stores the predicted data in the buffer. If the disk drive receives a read command from the host for data identical to the predicted data, the disk drive transfers the data from the buffer to the host.

However, even when predicting subsequent read requests by the host, in some cases the host does not send a read command requesting the same data as the predicted data. In such cases, the requested data is read from the disk and transferred to the host. Therefore, if the file was recorded physically discretely, it takes a long period of time to read and write one file.

SUMMARY OF THE INVENTION

It is therefore an object of the present invention to provide a method and apparatus to read and write data which reduces the read and write time.

The foregoing object is achieved by a disk drive of the present invention comprising a head, controller and storage, such as RAM. The head writes data sent from the host to a recording area on the disk. The head also reads data from the disk and sends it to the host. When the host sends the data and a first address to control the data, the controller controls the head such that the data are written to a physically continuous recording area on the disk. The filename, first address, and a second address representing the physical address of the recording area on the disk are correspondingly stored.

The controller controls the head such that the data is read from the disk and sent to the host based on the correspondence of the first and second addresses.

Said storage comprises a first storage area for correspondingly storing the filename and the first address and a second storage area for correspondingly storing the first address and second addresses.

Also, the disk drive of the present invention comprises a head, storage, controller, and change means. The head and storage were described above. The controller controls the head such that the data is read from the disk and sent to the host based on the correspondence of the first and second addresses. The controller also controls the head such that if the data is not recorded on a physically continuous recording area of the disk, then the recording area of the data is changed to a physically continuous recording area of the disk. The change means changes the second address stored in said storage means to an address of the recording area changed by said controller.

Furthermore, the controller changes recording areas when the same data are read in the same order plural times.

Also, said storage comprises a first storage area for correspondingly storing said filename and said first address and a second storage area for correspondingly storing said first and second addresses.

In addition, the controller controls the head such that if a defective area exists in the physically continuous recording area of said disk, data to be written to the defective area are written to a predetermined alternative area. Also, said controller changes said alternative area to an area physically continuous to said defective area. That is, if a defective area exists in the physically continuous recording area of the disk, data to be written said defective area are written to an area continuous to said defective area. If data continuous to said data to be written said defective area, said data are written to an area continuous to said area continuous to said defective area.

Also, in the method of the present invention, when data from a host and a first address for controlling the data are received, the data are written to a physically continuous recording area of the disk. The filename, a first address and a second address, are correspondingly stored.

The data to be transferred to the host are read from the disk based on the correspondence of the first and second addresses.

In addition, the filename and the first address are correspondingly stored; and said first and second addresses are correspondingly stored.

In the method of the present invention, a filename, a first address for controlling the data, and a second address representing the physical address of a recording area of the data are correspondingly stored. The data to be sent to said host are read from the disk based on the correspondence of the first and second addresses. If the data are not recorded on a physically continuous recording area of the disk, the recording area of the data is changed to a physically continuous recording area of the disk. The stored second address is changed to the address of the changed recording area.

The present invention changes the recording area when the same data are read in the same order at least twice.

Also, the present invention correspondingly stores the filename and first address, and correspondingly stores the first and second addresses.

In the method described above, if a defective area exists in the physically continuous recording area of the disk, data to be written to the defective area are written to a predetermined alternate area. In addition, the alternate area is physically continuous to the defective area. In particular, if a defective area exists in the physically continuous recording area, data to be written to the defective area is written to an area continuous to said defective area. If there exist data continuous to said data to be written said defective area, the data is written to an area continuous to the area continuous to the defective area.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

FIG. 5 is a diagram of a file control table;

FIG. 6 is a diagram of a conversion table;

FIGS. 9a, 9b, and 9c are diagrams of an example of changing the recording area by executing the method of the first embodiment of the present invention;

BEST MODE FOR CARRYING OUT THE INVENTION

Figure 1:
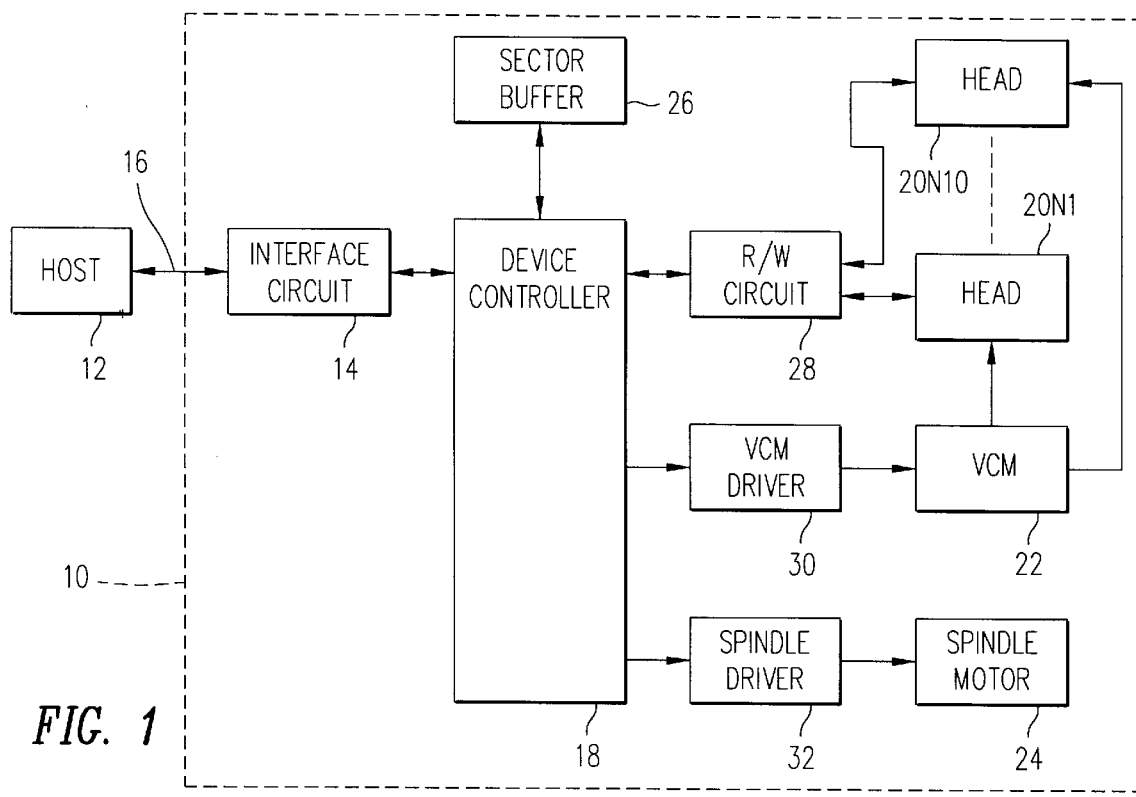
FIG. 1 is a block diagram of the structure of an embodiment of the present invention in a computer system.

When the host transfers data and a first address for controlling the data, the controller controls the head such that the data are written to a physically continuous recording area of the disk.

The storage correspondingly stores the filename, first address, and a second address representing the address of the recording area. The storage comprises a first and a second storage area. For example, the first storage area correspondingly stores a filename and the first address; and, the second storage area correspondingly stores the first and second addresses.

Therefore, if the data sent from the host is written to a physically continuous recording area of the disk, and the filename, first address, and second address are correspondingly stored, then the controller controls the head such that the data is read from the disk and sent to the host, based on the correspondence of the first and second addresses. Therefore, under the control of the controller, the head reads the requested data from the disk based on the second address. The recording area corresponding to the second address is a physically continuous recording area. Therefore, the data is read sequentially.

In the method of the present invention, when the host transfers data and a first address for controlling the data, the data is written to a physically continuous recording area of the disk. The filename, first address, and a second address representing the address of said physically continuous recording area are correspondingly stored. The filename and first address are correspondingly stored, and the first and second addresses are correspondingly stored. Based on the second address, the data is read from the disk and sent to the host.

The data is read sequentially because the data is written to a physically continuous recording area of the disk.

In the disk drive of the present invention, the head writes the data sent from a host to a disk. The head also reads data from the disk to send the data to the host.

The storage correspondingly stores a filename, a first address for controlling the data sent from the host, and a second address representing the physical storage location on the disk. The storage is provided with a first storage area and a second storage area. For example, when the storage is provided with a first storage area and a second storage area, the data representing the data transferred from the host, hereinafter referred to as filename, and the first address are correspondingly stored in the first storage area. The first address and second addresses are correspondingly stored in the second storage area.

The controller controls the head such that the data to be sent to the host are read from the disk based on the correspondence of said first and second addresses. The controller also controls the head such that if the data is not stored on a physically continuous recording area of the disk, then the recording area of the data is changed to a physically continuous recording area of the disk.

The change means changes the second address stored in said storage means to the address of the recording area changed by the controller.

Also, in the data read-write method of the present invention, the filename, a first address for controlling the data, and a second address representing the address of the recording area of the data are correspondingly stored. The data to be sent to the host are read from the disk based on the correspondence of the first and second addresses. If the data is not recorded on a physically continuous recording area of the disk, the recording area of the data is changed to a physically continuous recording area of the disk. The stored second address is also changed to the address of the changed recording area.

Therefore, based on the correspondence between the first and second addresses, the data to be sent to said host are again read from said disk. The data is read sequentially because the data is written to a physically continuous recording area of the disk.

In the present invention, the controller changes the recording area when the same data are read in the same order at least twice. Similarly, in the data storage method of the present invention, the recording area is changed when the same data are read in the same order at least twice. Therefore, if the recording area is changed when the same data are read in the same order at least twice, the data frequently read are recorded on the physically continuous area of the disk. Therefore, the data is read sequentially.

In the present invention, the controller controls the head such that if a defective area exists in the physically continuous recording area of the disk, then data to be written to the defective area are written to a predetermined alternative area. Similarly, in the data read-write method of the present invention, when a defective area exists in the physically continuous recording area of the disk, data to be written to the defective area are written to a predetermined alternative area.

When subsequently read, the data is read sequentially because data other than the data that will be written to the alternative area are written to the physically continuous area.

Also, in the disk drive of the present invention, the controller changes the alternative area to an area physically continuous to the defective area. In particular, the controller controls the head such that when a defective area exists in the physically continuous recording area, data to be written to the defective area are written to an area continuous to the defective area. Furthermore, the controller controls the head such that when there exists data continuous to the data to be written to the defective area, the data is written to an area continuous to said area continuous to said defective area. Similarly, in the data read-write method of the present invention, the alternate area is changed to an area physically continuous to the defective area. In particular, when a defective area exists in the physically continuous recording area, data to be written to the defective area are written to an area continuous to the defective area. When there exists data continuous to said data to be written said defective area, said data is written to an area continuous to said area continuous to said defective area.

When subsequently read, the data is read relatively sequentially because the defective area is skipped.

A first embodiment of the present invention will hereinafter be described with reference to the drawings. Referring now to FIG. 1, a disk drive 10 (hereinafter referred to as an HDD) of the present embodiment is shown. In FIG. 1, the HDD 10 is enclosed by a broken line. The HDD connects through a system bus 16, AT bus for example, to a host 12. For example, the host 12 comprises a microprocessor such as i80386, the personal computer AT system of the present applicant or a compatible system, together with the HDD 10 and peripheral equipment such as a keyboard and a display (not shown).

Figure 3:
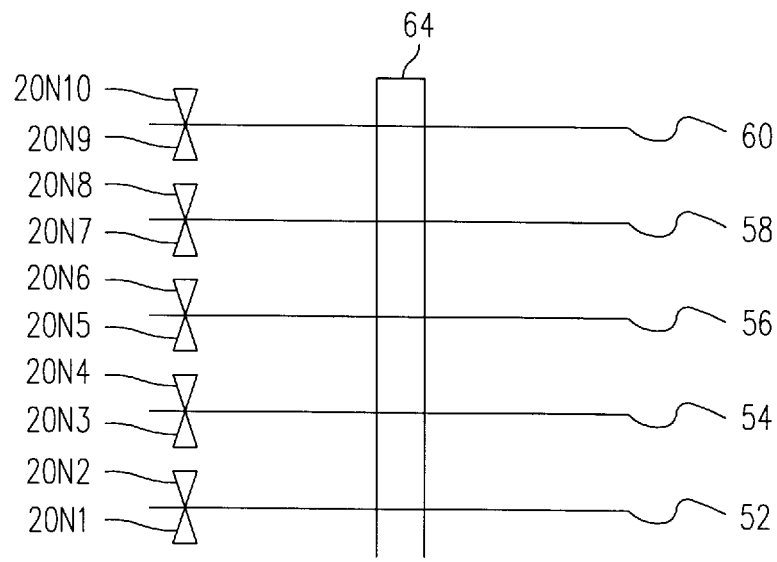
FIG. 3 is a diagram of a disk and head arrangement.

The HDD 10 comprises a device controller 18 for microprocessor control of the entire HDD. Referring also to FIG. 3, the HDD 10 can mount five disks 52 to 60 as data recording disks. Recording areas (hereinafter referred to as areas) are formed on both surfaces of each disk 52 to 60 such that data is written and read by corresponding heads 20N1 to 20N10. Also, on any or each of disks 52 to 60 (in this embodiment, disk 52) there is provided a predetermined area (hereinafter referred to as a spare cylinder) used for tests. The heads 20N1 to 20N10 correspond to the head of the present invention.

The device controller 18 controls reading and writing using the heads 20N1 to 20N10, a voice coil motor (VCM) 22 for moving the heads 20N1 to 20N10, and a spindle motor 24 for rotating a shaft 64 by means of which the disks 52 to 60 are rotated. The reading and writing by the heads 20N1 to 20N10 are performed using a sector buffer 26 and a read/write (R/W) circuit 28. In the present embodiment, the sector buffer 26 stores sixty-four (64) sectors of data (32 Kbytes). The R/W circuit 28 is well-known to those in the art and comprises various circuits required for reading and writing, such as an amplifier, a peak detector, a variable frequency oscillator (VFO), an coder, a decoder, servo system, an analog-digital converter, and a digital-analog converter. The control of the VCM 22 and the spindle motor 24 is performed through a VCM driver 30 and a spindle driver 32, respectively. Except for interface circuit 14, the system components shown in FIG. 1 are well-known in the art and therefore a description thereof is omitted.

Figure 2:
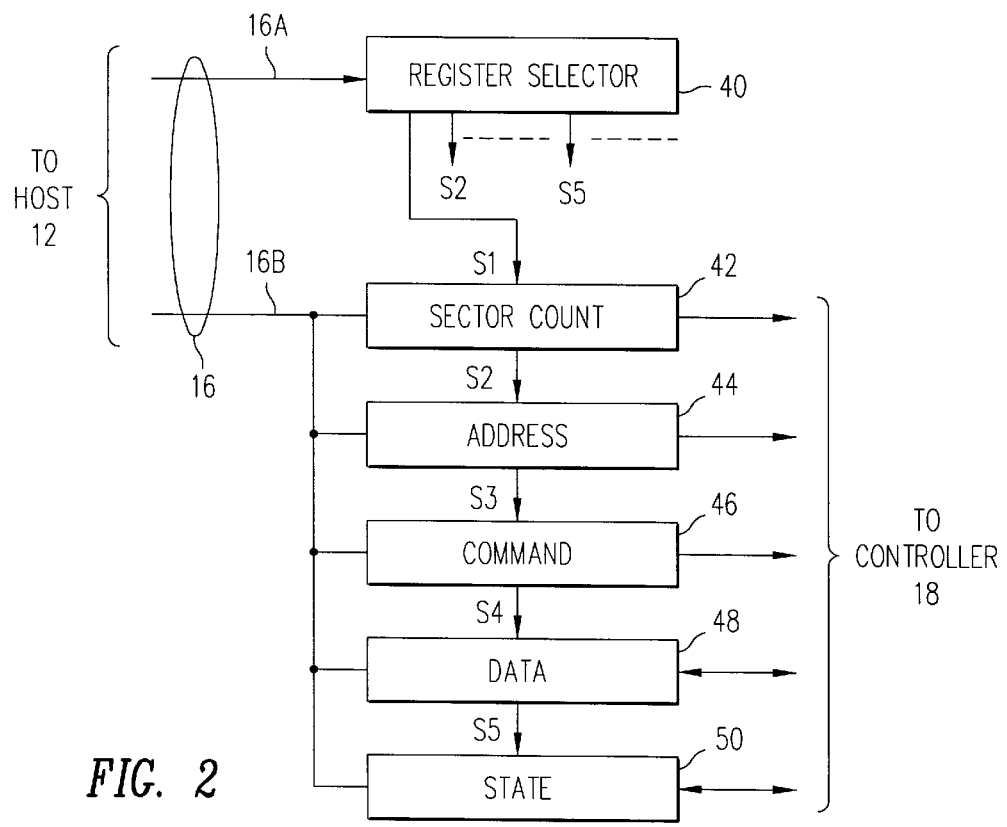
FIG. 2 is a block diagram of the structure of the input/output portion of the interface circuit to the host.

Referring now to FIGS. 1 and 2, the input-output portion of the interface circuit 14 comprises a plurality of registers that are selected by a register selector 40. The registers comprise a sector-count register 42, an address register 44, a command register 46, a data register 48, and a state register 50. The address register 44 consists of four registers. The four registers consist of two cylinder-address registers, one sector-address register, and one head-address register. For convenience, the four registers will be handled as a single register.

The sector-count register 42 stores the number of sectors to be read or written. The address register 44 stores an address. The command register 46 stores a command code. The data register 48 stores data to be written from the host 12 to the HDD 10, or data to be read from the HDD 10 to the host 12. The state register 50 includes a plurality of bits representing the state of the HDD. The registers are selected based on the information supplied from the host 12 to the register selector 40 through the system bus 16. When selecting, the register selector 40 generates a signal Si (I=1, 2, 3 . . . ) for selecting a specific register. In FIG. 2, only the five registers required for understanding the present invention are shown. In practice more registers are provided.

Figure 4:
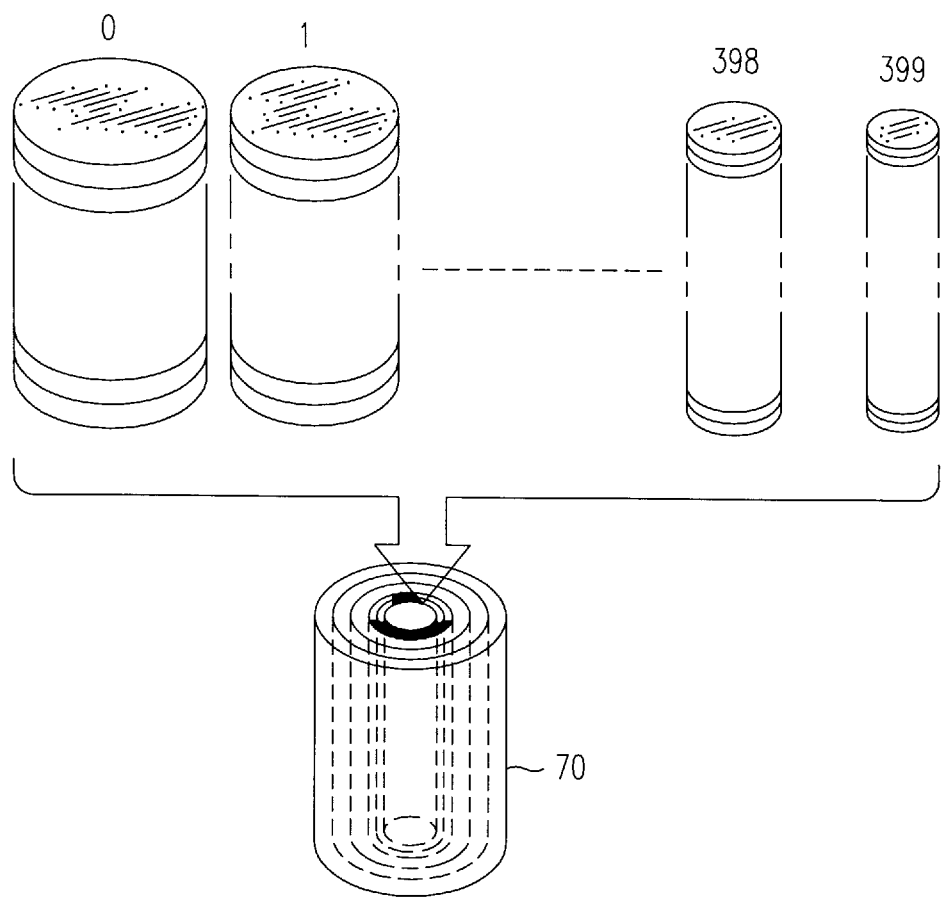
FIG. 4 is a diagram of a cylinder.

Referring to FIGS. 1, 3 and 5, the host 12 controls each data set recorded on the disks 52 to 60 by a file control table 72. Since the data of the file control table 72 are transferred from the HDD 10 to the host 12, the host 12 controls each data set recorded on the disks 52 to 60, based on the transferred data of the file control table 72. The file control table 72 is provided with a storage area 72a for storing a file name, a storage area 72b for storing a cylinder address C, a storage area 72c for storing a head address H, and a storage area 72d for storing a sector address S. The address specified by the cylinder address C corresponds to the track of the disks 52 to 60 (shown in FIG. 4). The cylinder address is numbered from 0, 1, . . . , 399 up to 400 in order of the outermost side to the innermost side. The head address H is specified by the head number 20N1 to 20N10. For example, the lower surface of the disk 52 is the number 1 of the head 20N1 and the lower surface of the disk 56 is the number 5 of the head 20N5. The sector address S is specified by 64 equal areas into which each of the disks 52 to 60 is divided with respect to the center of a shaft 64 to be described later.

Figure 8A:
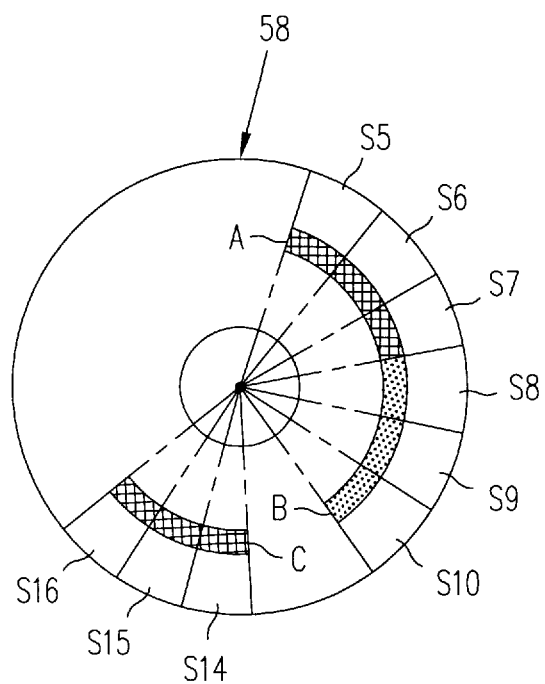
FIG. 8a is a diagram of an example of a file stored on physically discontinuous areas of a disk.

Referring now to FIG. 8a, for example, suppose that data file AAA whose file name is "AAA" is recorded on areas A and C of the disk 56 and the data file BBB whose file name is "BBB" is recorded on an area B of the disk 56. The addresses (CHS) of the area A are (11, 5, 5), (11, 5, 6), and (11, 5, 7). The addresses (CHS) of the area B are (11, 5, 8), (11, 5, 9), and (11, 5, 10). The addresses (CHS) of the area C are (11, 5, 14), (11, 5, 15), and (11, 5, 16). Referring now also to FIG. 5, in the storage areas 72b, 72c, and 72d of the file control table 72 corresponding to file AAA, there are stored (11, 5, 5), (11, 5, 6), (11, 5, 7), (11, 5, 14), (11, 5, 15), and (11, 5, 16). Also, in storage area 72b, 72c, and 72d of the file control table 72 corresponding to the file BBB, there are stored (11, 5, 8), (11, 5, 9), and (11, 5, 10). From the addresses of the file control table 72, the host 12 recognizes that data file AAA is recorded on the areas A and C of the disk 56 and that data file BBB is recorded on area B of the disk 56.

Referring to FIG. 6, the device controller 18 controls each of the data files that are actually recorded on the disk, using a conversion table 74 as a second storage area. The conversion table 74 is provided with a storage area 74a for storing an address controlled by the host and a storage area 74b for storing an address on the disk.

In storage area 74a of the conversion table 74 there are stored data identical with the data of the storage regions 72b, 72c, and 72d of the file control table 72. For example, there are stored (11, 5, 5), (11, 5, 6), (11, 5, 7), (11, 5, 14), (11, 5, 15), and (11, 5, 16) which are the addresses (CHS) of data file AAA stored in storage areas 72b, 72c, and 72d of the file control table 72, and (11, 5, 8), (11, 5, 9), and (11, 5, 10) which are the addresses (CHS) of data file BBB.

In addition, to store the address on a disk, the storage area 74b of the conversion table 74 is provided with a storage area 74b1 for storing a cylinder address C, a storage area 74b2 for storing a head address H, and a storage area 74b3 for storing a sector address S.

Figure 8B:
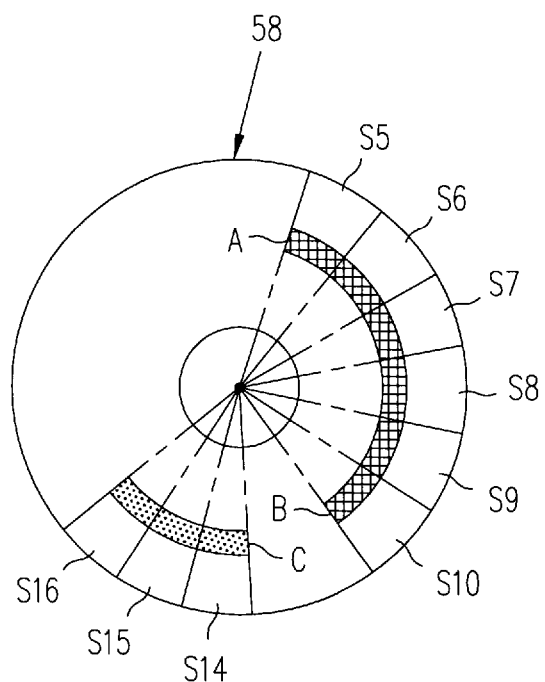
FIG. 8b is a diagram of an example of changing file storage to record a file on a physically continuous area of the disk.

In the present embodiment, a file is first transferred to the host 12, then the verification of the transferred file is executed according to a predetermined method. When predetermined requirements are met, the file is recorded on a physically continuous area of the disk, as will be described later. In particular, as shown in FIG. 8a, for example, after the data of the file AAA which are recorded on the areas A and C of the disk 58 are transferred to the host 12, it is determined if the file AAA has been recorded on the physically continuous region of the disk. If NOT, the data of the file AAA recorded on the area C will be rerecorded on the area B (shown in FIG. 8b), and the data of the file BBB recorded on the area B will be rerecorded on the region C.

For example, since the data recorded on the area A are not moved, the corresponding addresses (11, 5, 5), (11, 5, 6), and (11, 5, 7) of the area A are stored in the storage area 74b. The data recorded on area C prior to the file AAA being transferred to the host 12 are moved to the region B after the transfer. Therefore the data recorded on the area B are moved to the area C. Hence, the addresses (11, 5, 8), (11, 5, 9), and (11, 5, 10) of the area B that are stored on the storage area 74b correspond to the addresses (11, 5, 14), (11, 5, 15), and (11, 5, 16) of the storage area 74a that the host 12 has recognized as having been recorded on the area C. Furthermore, the addresses (11, 5, 14), (11, 5, 15), and (11, 5, 16) of the area C that are stored on the storage area 74b correspond to the addresses (11, 5, 8), (11, 5, 9), and (11, 5, 10) of the storage area 74a that the host 12 recognizes as having been recorded on the area B.

In the storage region 74b, prior to rerecording the file on the physically continuous region of the disk, the data whose address is the same as the address stored on the storage area 74a are stored.

Referring to FIG. 3, the file control table 72 and the conversion table 74 are recorded on an area of a disk 52 to 60 that users cannot access. In the preferred embodiment of the present invention, the file control and conversion tables are recorded on disk 60.

The operation of the present embodiment will next be described. In the present embodiment, after transferring a file to the host 12, the file is recorded on the physically continuous area of the disk.

When the HDD 10 is turned on, $\mu$ code is executed, the file control table 72 is output to the host 12, and a conversion table 74 is generated in RAM (the table is read from the disk into RAM). The conversion table 74 is generated in RAM (not shown), based on the data of the conversion table 74 that was recorded on the user inaccessible area of the disk 52.

Figure 7B:
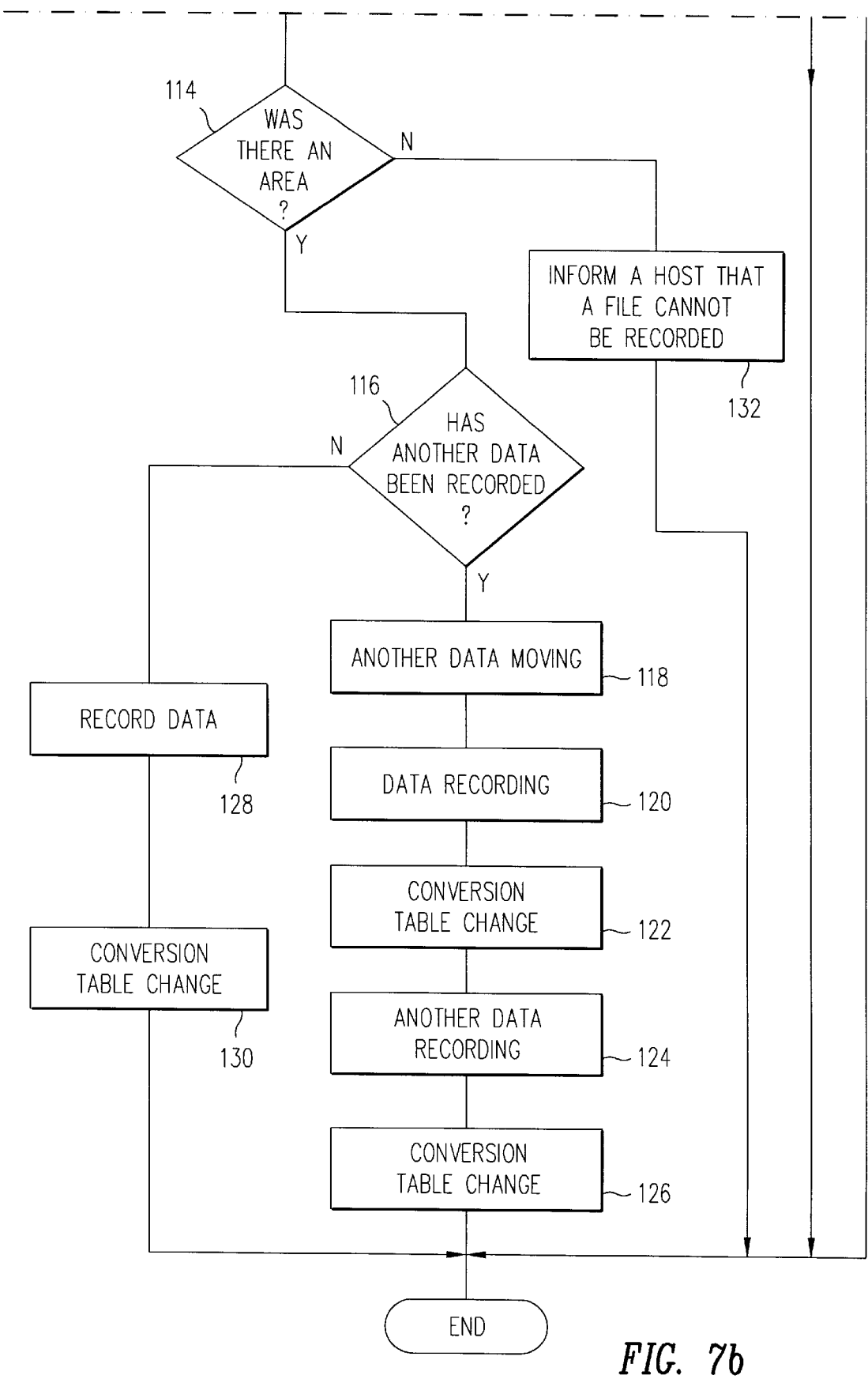
FIG. 7 is a flowchart of the processing routine of a first embodiment of the present invention.

Referring to FIG. 7, in step 102 it is determined if a command was input from the host 12.

Referring also to FIG. 2, when the host 12 sends the interface circuit 14 a command, the host 12 puts an address for selecting a specific register and an input-output write signal (IOW) on the bus 16A. The host 12 also puts information to be written to a selected register on the bus 16B. The buses 16A and 16B are part of the system bus 16.

For example, on a read command, the host 12 first inputs on the bus 16A a signal for indicating writing to the sector-count register 42. The address of the sector-count register 42, an input-out write signal, and then a sector count on the bus 16B are input.

In response to the signal on the bus 16A, the register selector 40 generates a signal S1 for selecting the sector-count register 42, and the register 42 is loaded with the sector count on the bus 16B. Next, the host 12 puts a signal to indicate writing to the address register 44 and an address specified based on the above-described file control table 72 on the buses 16A and 16B, respectively.

In response, the register selector 40 generates a signal S2 to select the sector-count register 44, and the register 44 is loaded with the specified address on the bus 16B. Similarly, the host 12 puts a signal to indicate writing to the command register 46 and a read command code on buses 16A and 16B, respectively, and the command register 46 is loaded with the read command code. A write command is processed in the same manner as a read command, except that the command register 46 is loaded with a write command code.

Referring now to FIG. 7, if the loading of registers 42, 44, and 46 is complete, the determination in the step 102 will be "YES". When the determination in the step 102 is "YES", in step 104 it is determined whether the read-out command (hereinafter referred to as read command) was input from the host 12 by determining whether the command register 46 was loaded with the read command code. If "YES", step 104 advances to step 106. In step 106, a read operation is executed based on the content of the read command code. That is, the address loaded in the address register 44 is the address that the host specified based on file control table 72. Based on the address loaded in address register 44, an address corresponding to the address loaded in address register 44 is read from the storage area 74b by referring to the storage area 74a of the conversion table 74. Based on the address read from the storage area 74b, a file is read from any of the areas of the disks 52 to 60, and the file is written to the sector buffer 26. Step 106 advances to step 108.

In step 108 the file is transferred. The data is transferred from the device controller 18 to the host 12 while read operation is performed upon an interrupt. If data of a predetermined number of sectors, one sector for example, are written from the disk to the sector buffer 26 and the data is ready to be sent to the host, then the device controller 18 sends the interface circuit 14 a data request signal DRQ. In response, the interface circuit 14 sends an interrupt request signal IRQ and makes an interrupt to the host 12, to start the data transfer from the sector buffer 26 to the host 12. The host 12 that was input the interrupt request signal IRQ sends the interface circuit 14 a data transfer request signal. If the interface circuit 14 inputs that signal, it starts the data transfer from the sector buffer 26 to the host 12. The data file is transferred by repetitively transferring data of one sector in the above described manner.

If the data transfer is complete, step 108 advances to step 110. In step 110, it is determined whether the data read from the disk are not recorded on a physically continuous area of the disk by referring to the storage area 74b of the conversion table 74. For example, when the file AAA recorded on the areas A and C of the disk 58 were transferred (shown in FIG. 8a), the discontinuous addresses corresponding to the areas A and C are stored in the storage region 74b of the conversion table 74. For the file BBB recorded only on the area B of the disk 58, the continuous addresses corresponding to the area B are stored in the storage area 74b of the conversion table 74. If the data recorded on the continuous area on the disk, such as the file BBB, are read and transferred, the determination in the step 110 is "NO." Therefore, the file is physically continuously recorded on the disk. Therefore, the data does not need to be moved and the present processing is complete.

If data recorded on the discontinuous areas on the disk, such as the file AAA, are read and transferred, the determination in the step 110 is "YES." Step 110 advances to step 112. In step 112, there is a search for an area on which a file can be physically continuously recorded. Step 112 advances to step 114. In step 114, it is determined whether there was an area on which a file can be physically continuously recorded. For example, when data are recorded on all of the areas of the disks 52 to 60 and there is no area on which a file can be physically continuously recorded, step 114 advances to step 132. In step 132, the host 12 is informed that a file cannot be recorded.

When there is an area on which a file can be physically continuously recorded, step 114 advances to step 116. In step 116, it is determined whether another data, hereinafter referred to as other data, were recorded on the area on which a file can be physically continuously recorded. If "YES", in step 118, the other data is moved. Referring to FIG. 8a, for example, the file AAA is recorded on areas A and C of the disk 58. The data recorded on the area C can be recorded on the area B to record the file AAA in a physically continuous area.

However, if the data recorded on the area C is immediately recorded on the area B, the data recorded on the area B will be deleted. The other data is therefore recorded on another area. For example, the file BBB, recorded on the area B, is read and recorded on the spare cylinder of the disk 60 (shown in FIG. 9a). Since the other data (file BBB) was moved, in step 120 the data recorded on the discontinuous area is recorded on the continuous area. Referring to FIG. 9b, for example, the data recorded on the area C is recorded on the area B. Therefore, the file AAA recorded on discontinuous areas A and C of disk 58 is recorded on continuous areas A and B (shown in FIG. 8b). Step 120 advances to step 122.

Since the recording area of the file (file AAA) is thus changed to a physically continuous area, in step 122 the address of the data stored on the storage area 74b of the conversion 74 is changed to the address of the physically continuous area. Step 122 advances to step 124.

In step 124, the data recorded on the spare cylinder is recorded on an area other than the spare cylinder. Referring to FIG. 9c, the data that had prevented the file recorded on the discontinuous area from being recorded on the continuous area, such as file BBB, is recorded on area C, for example. Since the recording area of file BBB changed, in step 126 the address of the file BBB stored on the storage region 74b of the conversion table 74 is changed to an address of the new recording area, area C; and the present processing is completed.

When the other data is not recorded on the area on which a file can be physically continuously recorded, step 116 advances to step 128. In step 128, the data transferred from the host 12 is recorded on the physically continuously area obtained in step 112. Step 128 advances to step 130. In step 130, the address of the data stored in the storage region 74b of the conversion table 74 is changed to the address of the physically continuous area; and the present processing is completed.

When the write command code is loaded in the command register 46, step 104 advances to step 134. In step 134, it is determined whether the address specified by the host 12 was stored in the storage region 74a of the conversion table 74. If "YES", as in a case where the file has been read, the address of the area on which that file is recorded is specified and a write command code is loaded. In step 136, reference is made to the storage area 74a to read from the storage area 74b the address corresponding to the address specified by the host 12, and the file is recorded upon the address read out. The present processing is then complete.

If the determination in step 134 is "NO," a new address for writing new data was specified. Step 134 advances to step 138. In step 138, the new data is recorded on a physically continuous area next to the area on which data were physically continuously recorded. Step 138 advances to step 140. In step 140, the address specified by the host 12 is stored in the storage area 74a. In addition, the address of the area recorded to step 138 is stored in the storage area 74b. The present processing is complete.

As described above, if a file read from the disk is not recorded on a physically continuous area on the disk, the area of that file is changed to the physically continuous area on the disk. Also, in conversion table 72, the address on the disk recorded on changed to the address of the changed area. Therefore, when the file is subsequently read, the file is read continuously because the file was recorded on the physically continuous area on the data recording disk. Therefore, the seek time is shortened and the processing time for transferring data is shortened.

Although in the above-described embodiment the data recorded on the areas B and C are exchanged to record a file on a physically continuous area (shown in FIG. 8), the present invention is not limited to this. In an alternative embodiment, the data recorded on areas A and C are recorded on other physically continuous areas, then the data recorded on the areas A and C are deleted. In another alternative embodiment, the data recorded on area B are moved to another area, and the data recorded on area C are recorded on area B.

In the above-described embodiment, after a file is sent to the host, it is determined whether the file was recorded on the physically continuous area of the disk. When that determination is "NO," the file is recorded on the physically continuous area of the disk. The present invention is not limited to this. In an alternative embodiment, after a file is read, if the file was not recorded on the physically continuous area of the disk, the file is recorded on the physically continuous area of the disk, then the file is transferred to the host.

A second embodiment of the present invention will next be described. The second embodiment is identical in constitution with the above-described embodiment. Therefore the constitution of this embodiment will not be described.

The operation of the second embodiment will next be described. In the first embodiment, a file is transferred to the host 12 and then is recorded on the physically continuous area of the disk. In the present embodiment, the file transferred from the host 12 is written to the physically continuous area of the disk when the file is written. The operation identical with that of the first embodiment will be described in brief.

Figure 10:
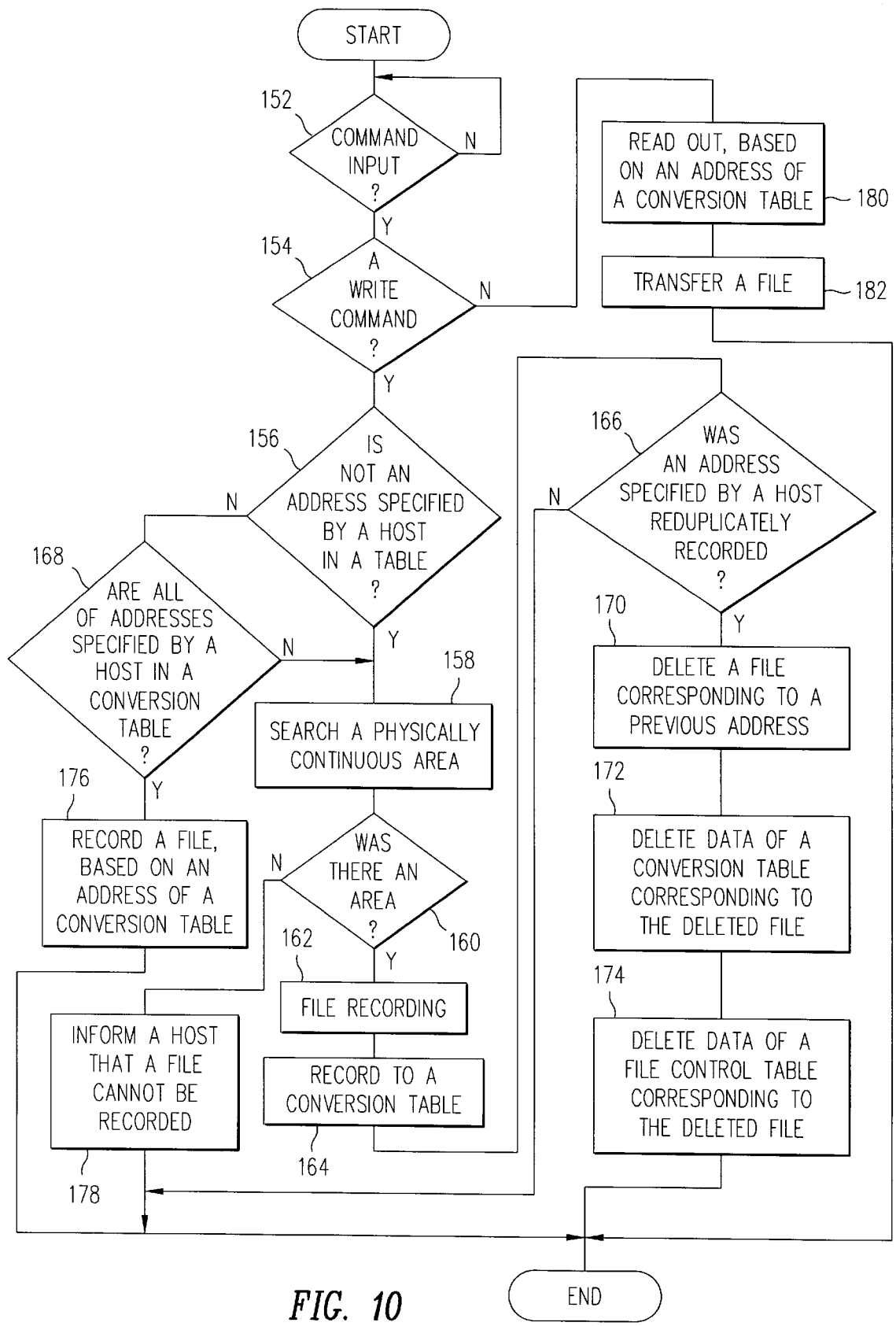
FIG. 10 is a flowchart of the processing routine of a second embodiment of the present invention.

Referring now to FIG. 10, in step 152 it is determined whether a command is input. If "YES," step 152 advances to step 154. In step 154, it is determined whether a write command was input. If "YES," when the write command was input, the step 154 advances to step 156. In step 156, it is determined whether the address specified by the host 12 was not recorded on the storage area 74a of the conversion table 74. For example, when new data is written, a new address is specified; therefore, the address specified by the host 12 is not stored in the conversion table 74. Therefore, the determination in the step 156 is "YES," and step 158 advances to step 158. In step 158, a search for a physically continuous area for recording a file is performed. Step 158 advances to step 160. In step 160, it is determined whether a physically continuous area is in any of disks 52 to 60. If the determination is "YES", step 160 advances to step 162. In step 162, a file is recorded on the area obtained in the step 158. Step 162 advances to step 164. In step 164, the new address is stored in the storage area 74a of the conversion table 74. Also, the address of the physically continuous area is stored in the storage area 74b of the conversion table 74. Step 164 advances to step 166. In step 166, it is determined whether the address specified by the host 12 was reduplicatively recorded on the storage area 74a. When a new file is recorded, as described above, only the new address is recorded on the storage area 74a of the conversion table 74. Therefore, the determination in step 166 is "NO." and the present processing is complete.

In step 156, when the address specified by the host 12 is in the conversion table 74, the determination is "NO" and step 156 advances to step 168. In step 168, it is determined whether all of the addresses specified by the host 12 are in storage area 74a of the conversion table 74. For example, this occurs when a file is read and modified, and the amount of data increases. The host 12 also records the additional data on the disk. Therefore, the host specifies an address for recording the additional data.

Therefore, in step 168, when a host specified address is not in the conversion table 74, the determination in the step 168 is "NO." Step 168 advances to step 158 in which the previously described steps 158 to 166 are performed. In this case, in step 164, the address of the already recorded area is reduplicatively recorded in the storage area 74a of the conversion table 74 in addition to the address for recording the additional data. Therefore, the determination in step 166 is "YES." Step 166 advances to step 170. In step 170, the file corresponding to a previous address is deleted from the disk. In step 172, the data of the conversion table 74 corresponding to the deleted file is deleted. In step 174, the data of the file control table 72 corresponding to the deleted file is deleted, and the present processing is completed.

When the determination in step 168 is "YES," such as when a file was read and modified, and the amount of data decreases or remains the same, only the address as read is specified. Step 168 advances to step 176. In step 176, reference to the storage area 74a of the conversion table 74 is made, the address corresponding to the address specified by the host 13 is read from the storage area 74b. The file is recorded based on the address, and the present processing is completed.

When a read command was input, the determination in the step 154 is "YES." Step 154 advances to step 180. In step 180, reference to the storage area 74a of the conversion table 74 is made, the address corresponding to the address specified by the host 13 is read from storage area 74b, and the file is read based on the address. Step 180 advances to step 182. In step 182, the file is transferred.

As described above, in the present embodiment, the data to be transferred from the host are written to the physically continuous area on the disk; the file name and the address specified by the host are correspondingly stored; and the address specified by the host and the address on the disk are correspondingly stored. Therefore, when a file is read, a file to be transferred from the disk to the host is read based on the correspondence of the host specified address and the disk address. The file is continuously read because it was written to the physically continuous area of the disk. Therefore, the seek time and processing time for transferring data is shortened.

A third embodiment of the present invention will next be described. This embodiment is identical in constitution with the first embodiment, therefore the same reference characters will be applied to the same parts and a description of the same parts will not be given. Furthermore, the same reference characters will applied to the parts identical in operation to the first embodiment and a description thereof will not be given. Note that the RAM (not shown) of the device controller 18 has a table in which a read-out order to be described later and a count value representing of the number of times read out in the read-out order are correspondingly stored.

The operation of the third embodiment will next be described. In the above-described first embodiment, when a file recorded on the discontinuous area was read, that file is recorded on the continuous area. However, in the third embodiment, when some data of a specific file are read in the same order at least twice, the recording areas of the data are changed according to the read-out order. Also, as an initial state, an address I for recording a read-out order is set to 0.

Figure 11:
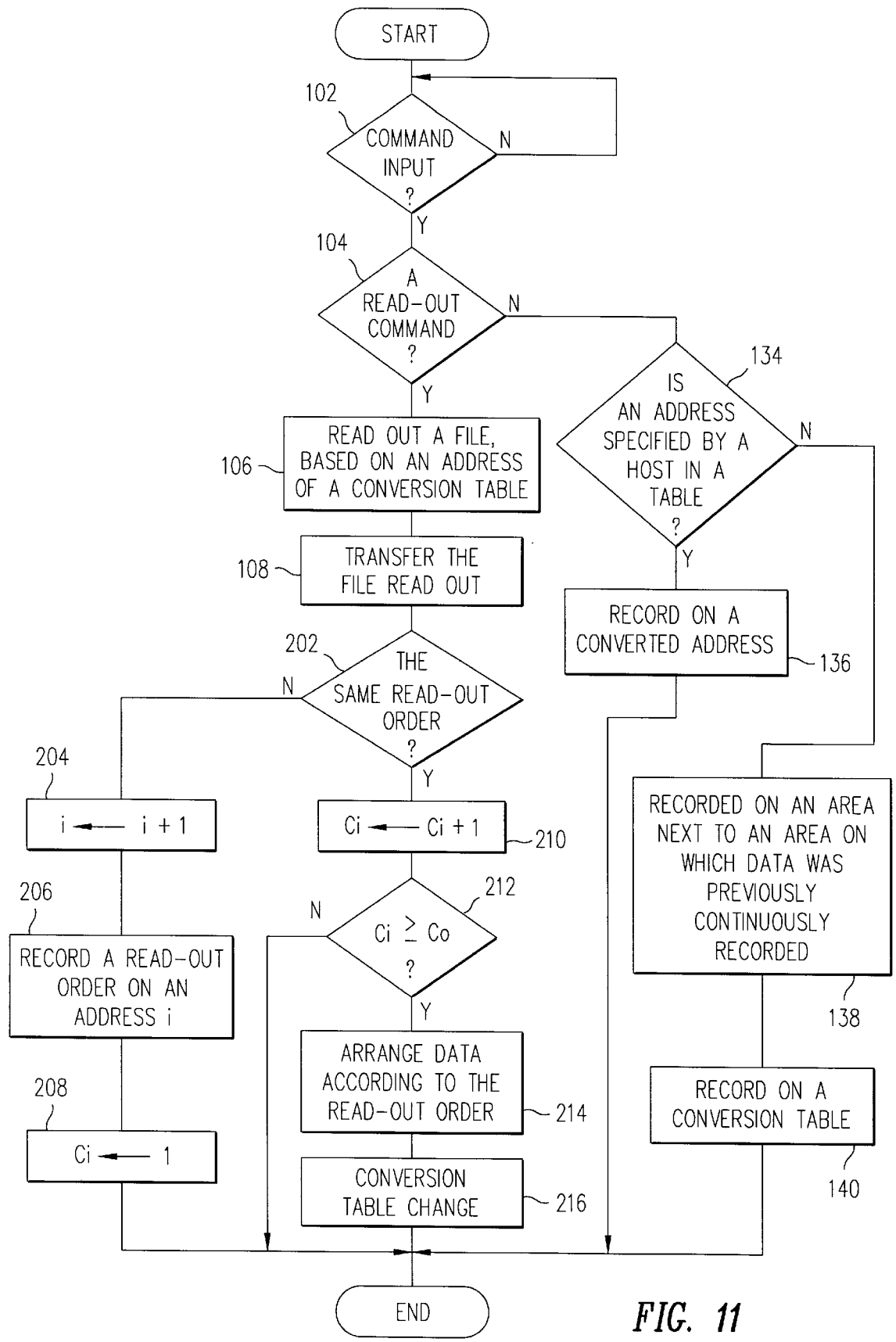
FIG. 11 is a flowchart of the processing of a third embodiment of the present invention.

Referring now to FIG. 11, in step 202, it is determined whether data is stored in the same read-out order. That is, it is determined if data have been stored in the above-described RAM in the order read at this time. If "NO," data is read for the first time in that read-out order. Therefore, in step 204, a variable I is incremented by 1. Step 204 advances to step 206. In step 206, the read-out order is stored in an address I. Step 206 advances to step 208. In step 208, a count value Ci is set to 1, and the present processing is complete.

However, if the determination in the step 202 is "YES," step 202 advances to step 210. In step 210, the count value Ci is incremented by 1. Step 210 advances to step 212. In step 212, it is determined whether the count value Ci is greater than or equal to a predetermined value Co, such as 10 for example. If the count value Ci is less than the predetermined value Co, the determination in the step 212 is "NO." The present processing is complete because data is not read frequently in that read-out order.

In step 212, if the count value Ci is greater than or equal to the predetermined value Co, then the determination in the step 212 is "YES." If "YES," data are frequently read in that read-out order. Step 212 advances to step 214. In step 214, the data are arranged according to the read-out order.

Figure 12A:
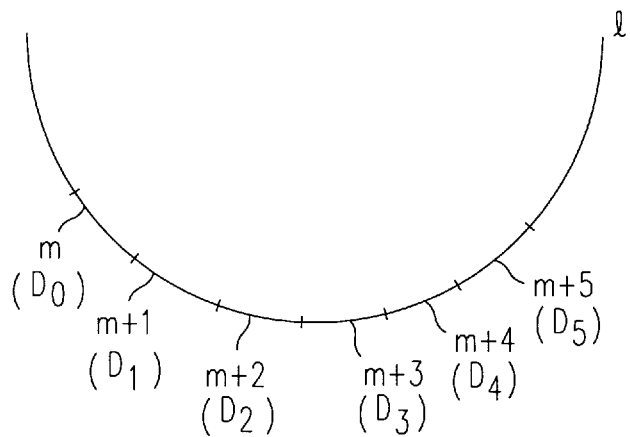
FIG. 12a is a diagram of the data recording area before changing by the read-out order.
Figure 12B:
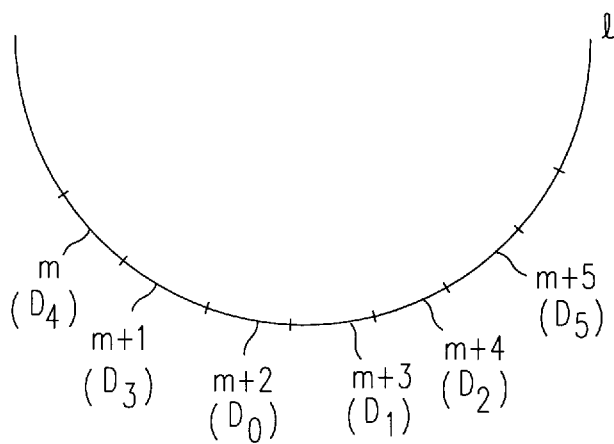
FIG. 12b is a diagram of the data recording area after changing by the read-out order.

Referring also to FIG. 12a, assume that a file CCC consists of data $D_0$, $D_1$, $D_2$, $D_3$, $D_4$, and $D_5$. The data $D_0$, $D_1$, $D_2$, $D_3$, $D_4$, and $D_5$ are recorded on the areas specified by the sectors m, m+1, m+2, m+3, m+4, and m+5 of the cylinder 1 of the disk, respectively. For example, the data $D_4$, $D_3$, and $D_0$, are read in the recited order. In this example, the file is first read and the data of the file CCC that are read out are recorded on the above-described spare cylinder. Referring to FIG. 12b, according to the read-out order, the data $D_4$ are changed to the area specified by the sector m. The data $D_1$ are changed to the area specified by the sector m+1. The data $D_0$ are changed to the area specified by the sector m+2. The data $D_3$ are changed to the area specified by the sector m+3. The data $D_2$ are changed to the area specified by the sector m+4. The data $D_5$ are changed to the area specified by the sector m+5. Step 214 advances to step 216. In step 216, the address recorded on the storage area 74b of the conversion table 74 is changed to the address of the changed area.

As described above, according to the present embodiment, when the same data is read in the same order at least twice, the area of the data is changed. Therefore, the data frequently read are recorded on the physically continuous areas of the disk. When the data are subsequently read, the data are read continuously. Therefore, the seek time and processing time for transferring data are shortened.

A fourth embodiment of the present invention will next be described. The fourth embodiment is identical in constitution with the second embodiment. Therefore, the same reference characters will be applied to the same parts and a description will not be given.

The operation of this embodiment will next be described. The same reference characters will be applied to the same parts as the above-described second embodiment and a description of the same parts will not be given.

Figure 13A:
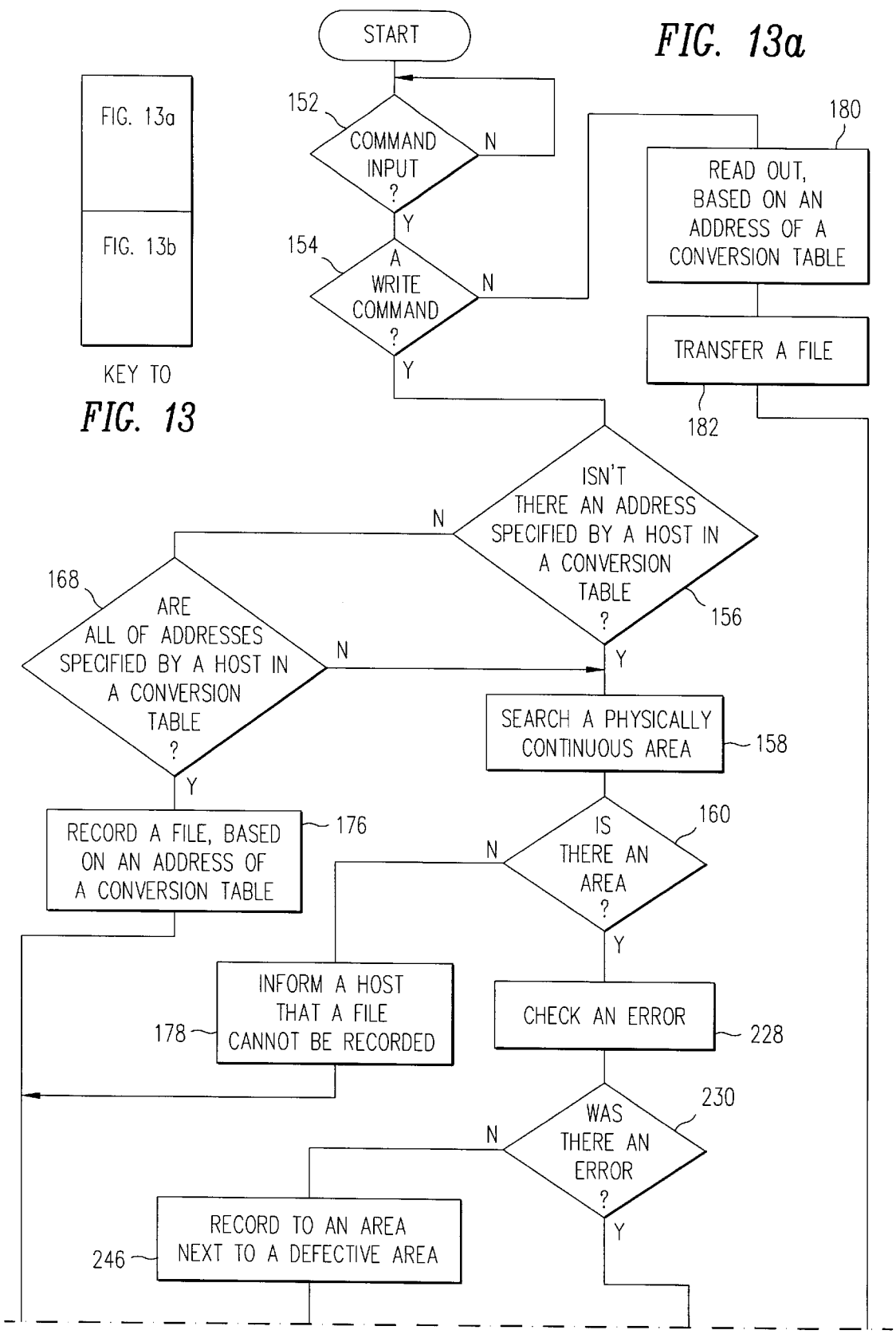
FIG. 13 is a flowchart of the processing of a fourth embodiment of the present invention.
Figure 13B:
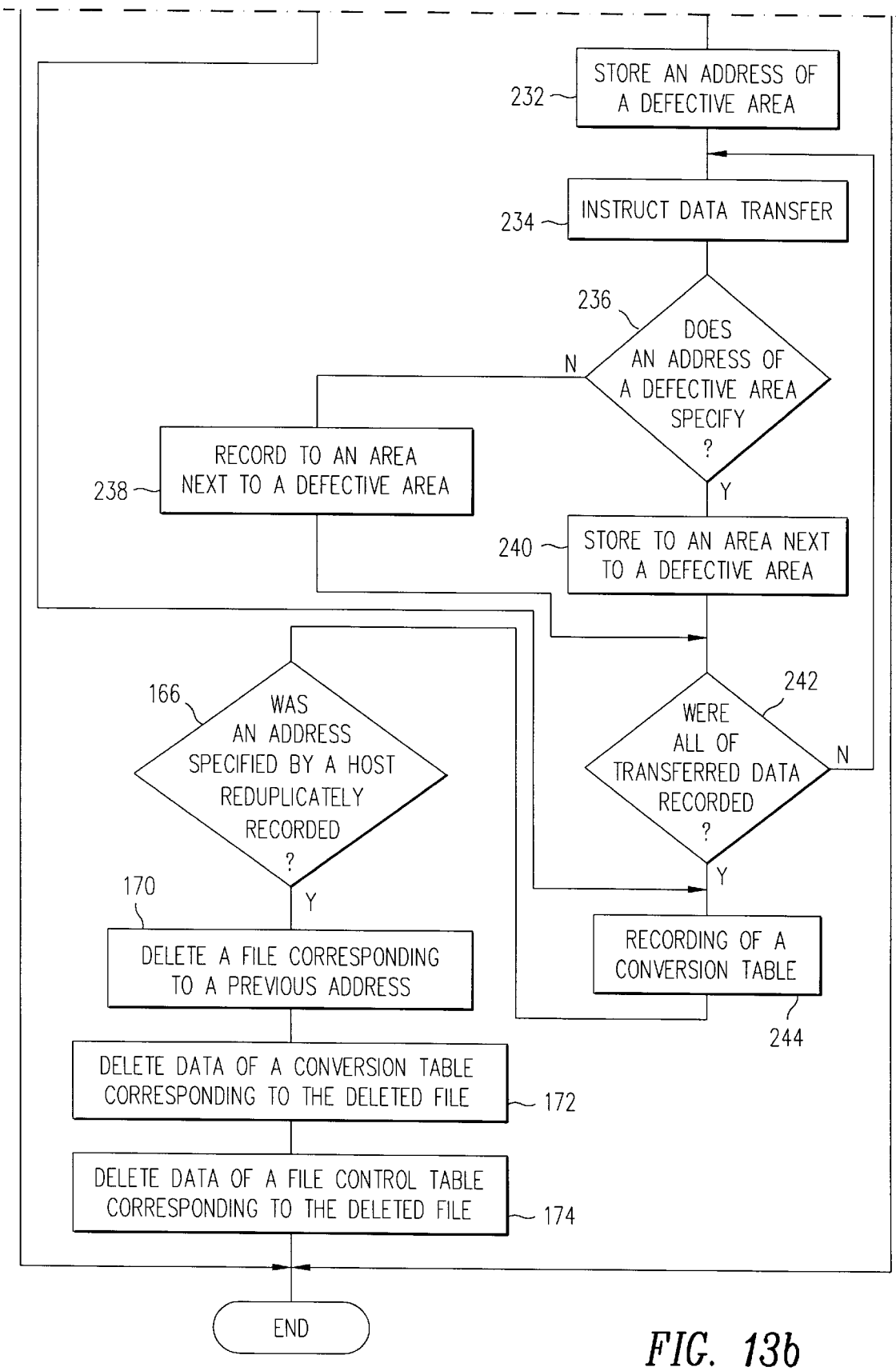
Figure 14:
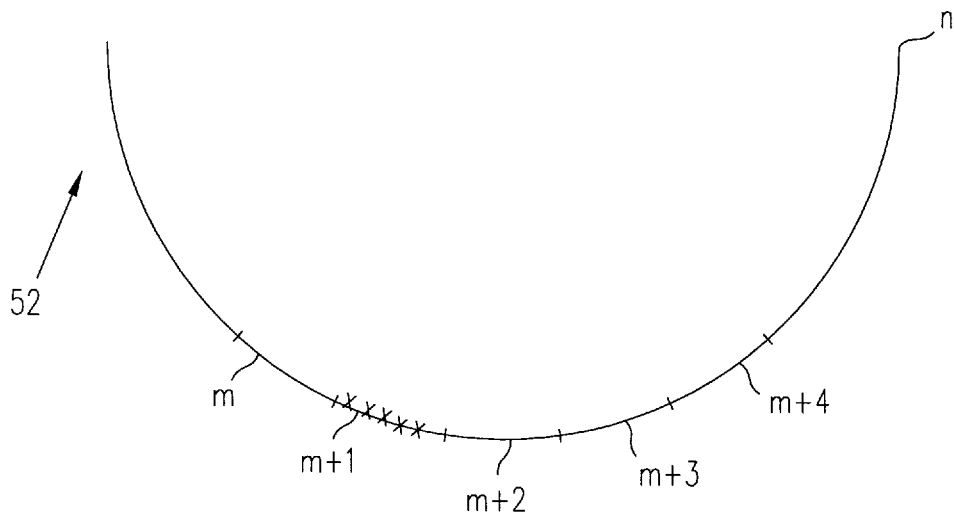
FIG. 14 is a diagram of a cylinder with a defective area.

Referring now to FIG. 13, in step 160 it is determined whether there was a physically continuous area. If "YES," step 160 advances to step 228. In step 228, an error check of the physically continuous area is performed to check for a defective area on which data cannot be recorded. Step 228 advances to step 230. In step 230, it is determined whether there was an error. Referring also to FIG. 14, for example, the areas specified by the sectors m to m+4 of cylinder n of disk 52 are a physically continuous area. The area specified by the sector m+1 is a defective area. In this case, in step 230, the determination is "YES," and step 230 advances to step 232. In step 232, the address of the defective area is stored. Step 232 advances to step 234. In step 234, the host 12 is instructed to transfer data. Step 234 advances to step 236.

The host 12 that received the instruction of data transfer specifies an address and data to be transferred. In step 236, the host 12 determines if the address of a defective area was specified. If the address of a defective area is not specified, step 246 advances to step 238. In step 238, the data is recorded on the physically continuous area obtained in the step 158. As shown in FIG. 14, data is recorded on the area specified by the sector m of the cylinder n of the disk 52, for example. Step 238 advances to step 242.

Figure 15:
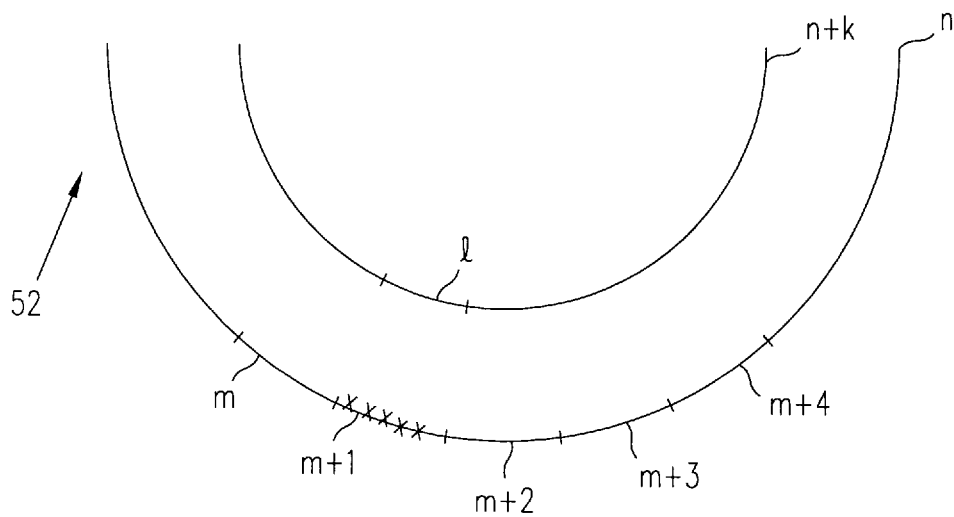
FIG. 15 is a diagram of a cylinder with a defective area and a cylinder with an alternate area.

However, in step 236, if the host 12 specified an address of a defective area, then step 236 advances to step 240. In step 240, the data is recorded on an alternate area. The area adjacent a defective area is an alternate area. In FIG. 14, the alternate area is the area specified by sector m+2. Referring also to FIG. 15, the alternate area is the area specified by the sector 1 of the cylinder n+k of the same disk. In the preferred embodiment of the present invention, the alternate area is adjacent the defective area. Step 240 advances to step 242.

In step 242, it is determined whether all of the transferred data is recorded. If "NO," step 242 returns to step 234, and the foregoing processing of steps 234 to 240 is performed. If "YES," step 242 advances to step 244. In step 244, the address of a file recorded on storage area 74b of the conversion table 74 is recorded according to the address specified by the host 12. For example, as shown in FIG. 14, when all of the transferred data is recorded, the transferred data is recorded on the areas specified by the sectors m and m+2 to m+5 of the cylinder n of the disk 52. Step 242 advances to step 244.

In step 230, if there was no an error in the physically continuous area, step 230 advances to step 246. In step 246, the data is recorded on the physically continuous area obtained in the step 158.

As described above, according to the present embodiment, when a defective area exists in a physically continuous area, data to be written to the defective area are written to a predetermined alternative area. Therefore, when the data is subsequently read, the data is read relatively continuously because the defective area is skipped and the data is read from an area adjacent the defective area. Therefore, the seek time and processing time for transferring data is shortened.

In the fourth embodiment of the present invention, a physically continuous area is searched in writing data to the disk. When a defective area exists in the obtained area, data to be written to the defective area are written to a predetermined alternative area. The present invention is not limited to this. In an alternative embodiment, after reading data, a physically continuous area is searched. If a defective area exists in the obtained area, data to be written to the defective area are written to a predetermined alternative area. Furthermore, after reading data at least twice, the same data is read in the same order at least twice, a physically continuous area for recording the same data is searched. If a defective area exists in the obtained area, data to be written to the defective area are written to a predetermined alternative area.

In the above-described fourth embodiment, although an area adjacent a defective area is used as an alternative area, the present invention is not limited to this. In an alternative embodiment, a previously specified area, such as an area specified by a predetermined sector of another cylinder of a disk in which a defective area exists, is the alternative area.

Although the file control table and the conversion table are formed in different areas in the previously described embodiments, the present invention is not limited to this. In an alternative embodiment, a file name, a host specified address, and a disk address are correspondingly stored in a single table.

Although in the embodiments the reading and writing of data is performed in units of a sector, the present invention is not limited to this. In an alternative embodiment, the reading and writing of data is performed in units of a track.

As previously described, the present invention writes the data sent from the host to the physically continuous recording area of the data recording disk, and correspondingly stores the data representative of the data sent from the host, the first address, and the second address. Therefore, based on the correspondence of the first and second addresses, the data to be sent to the host are read from the disk. The present invention has the advantage that the data to be sent to the host are read sequentially because the second address which corresponds to the first address is a physically continuous area. The data is written to a physically continuous recording area of the disk.

The present invention writes the data sent from the host to the physically continuous recording area of the disk, and correspondingly stores the filename, a first address, and a second address. The data to be sent to the host are read based on the correspondence of the first and second addresses. The present invention has the advantage that the data is read sequentially because the data is written to a physically continuous recording area of the disk.

Furthermore, the present invention has the following advantage. Since the recording area is changed when the same data is read in the same order at least twice, data frequently read are recorded on the physically continuous area of the disk. Therefore the data is read sequentially.

When a defective area exists in the physically continuous recording area of the disk, data to be written to the defective area are written to a predetermined alternative area. Therefore, the present invention has the advantage that data to be written to the defective area are read sequentially when subsequently read, because data other than the data that will be written to the alternative area have been written to the physically continuous area. If a defective area exists in the physically continuous recording area of the disk, the data to be written to the defective area are written to an area continuous to the defective area. The present invention has the advantage that when the data is subsequently read, the defective area is skipped so that the data is read relatively sequentially.

A number of embodiments of the present invention have been described. Nevertheless, it will be understood that various modifications may be made without departing from the spirit and the scope of the invention. Accordingly, it is to be understood that the invention is not to be limited by the specific illustrated embodiments, but only by the scope of the appended claims.

What is claimed is:

1. A disk drive comprising:
    a disk having a recording area for storing data, said data having a host-specified address, said recording area having a physical address;
    a memory for storing said host-specified address and said physical address; and
    a controller for examining said physical address in said memory for determining if said data is recorded on a physically continuous recording area, if not then moving said data to a physically continuous recording area on said disk and updating said physical address stored in said memory.

2. A disk drive as recited in claim 1, wherein said data is moved to said physically continuous recording area after reading said data.

3. A disk drive as recited in claim 1, wherein said data is moved to said physically continuous recording area after reading said data in the same order at least twice.

4. A disk drive as recited in claim 1, wherein if a defect exists in said physically continuous recording area, said data in said defective physically continuous recording area is moved to an alternate area.

5. A disk drive as recited in claim 4, wherein said alternate area is adjacent said defective physically continuous recording area.

6. In a disk drive system comprising a disk having a recording area for storing data, said data having a host-specified address, said recording area having a physical address, a method for storing data comprising the steps of:
    storing in a memory said host-specified address and said physical address; and
    examining said physical address in said memory for determining if said data is recorded on a physically continuous recording area, if not then moving said data to a physically continuous recording area on said disk, and updating said physical address stored in said memory.

7. A method as recited in claim 6, wherein said data is moved to said physically continuous recording area after reading said data.

8. A method as recited in claim 6, wherein said data is moved to said physically continuous recording area after reading said data in the same order at least twice.

9. A method as recited in claim 6, wherein if a defect exists in said physically continuous recording area, then said data to be moved to said defective physically continuous recording area is moved to an alternate area.

10. A method as recited in claim 9, wherein said alternate area is adjacent said defective physically continuous recording area.

11. A disk drive comprising:
    a disk having a recording area for storing data, said data having a host-specified address, said recording area having a first physical address;
    a memory for storing said host-specified address and said first physical address; and
    a controller for receiving said data and said host-specified address, examining said host-specified addresses in said memory for determining if all host-specified addresses are stored in said memory, if not then writing said data to a physically continuous recording area having a second physical address, storing in said memory said host-specified address and said second physical address, and determining whether said host-specified address is duplicately recorded in said memory, if so then deleting said first physical address and said host-specified address from said memory.

12. In a disk drive comprising a disk having a recording area for storing data, said data having a host-specified address, said recording area having a first physical address, a method for storing data comprising the steps of:
    storing in a memory said host-specified address and said first physical address; and
    when receiving said data and said host-specified address, examining said host-specified addresses in said memory for determining if all host-specified addresses are stored in said memory, if not then writing said data to a physically continuous recording area having a second physical address, storing in said memory said host-specified address and said second physical address, and determining if said host-specified address is duplicately recorded in said memory, if so then deleting said first physical address and said host-specified address from said memory.

13. A computer program product for a disk drive system, said computer program product comprising:
    a computer usable medium having computer readable program code means embodied in said medium causing data to be stored in physically continuous recording areas on a disk, said computer program product including:
    computer readable first program code means for storing in a memory a host-specified address for data and a physical address for a recording area on a disk; and
    computer readable second program code means for examining said physical address in said memory for determining if said data is recorded on a physically continuous recording area of said disk, if not then moving said data to a physically continuous recording area on said disk, and updating said physical address stored in said memory.

14. A computer program product for a disk drive system, said computer program product comprising:

a computer usable medium having computer readable program code means embodied in said medium causing data to be stored in physically continuous recording areas on a disk, said computer program product including:

computer readable first program code means for storing in a memory a host-specified address and a first physical address; and computer readable second program code means for when receiving said data and said host-specified address, examining said host-specified addresses in said memory for determining if all host-specified addresses are stored in said memory, if not then writing said data to a physically continuous recording area having a second physical address, storing said host-specified address and said second physical address in said memory, and determining if said host-specified address is duplicately recorded in said memory, if so then deleting said first physical address and said host-specified address from said memory.

* * * * *